United States Patent
Bhagavathiperumal et al.

(10) Patent No.: US 10,212,083 B2
(45) Date of Patent: Feb. 19, 2019

(54) OPENFLOW DATA CHANNEL AND CONTROL CHANNEL SEPARATION

(71) Applicant: Lenovo Enterprise Solutions (Singapore) Pte. Ltd., Singapore (SG)

(72) Inventors: Chidambaram Bhagavathiperumal, Santa Clara, CA (US); Yi Bo Song, Wuxi (CN); Liang Yang, Nanjing (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 389 days.

(21) Appl. No.: 14/067,719

(22) Filed: Oct. 30, 2013

(65) Prior Publication Data

US 2015/0117202 A1 Apr. 30, 2015

(51) Int. Cl.
*H04L 12/801* (2013.01)

(52) U.S. Cl.
CPC .................... *H04L 47/10* (2013.01)

(58) Field of Classification Search
USPC ........................................... 370/235
See application file for complete search history.

(56) References Cited

U.S. PATENT DOCUMENTS

| | | | |
|---|---|---|---|
| 2011/0310901 A1 | 12/2011 | Uchida et al. | |
| 2011/0317559 A1 | 12/2011 | Kern et al. | |
| 2012/0257529 A1* | 10/2012 | Ehara et al. | 370/252 |
| 2013/0028091 A1 | 1/2013 | Sun et al. | |
| 2013/0034104 A1 | 2/2013 | Yedavalli et al. | |
| 2013/0058251 A1* | 3/2013 | Koponen | H04L 12/4633 370/254 |
| 2013/0071116 A1 | 3/2013 | Ong | |
| 2013/0077481 A1 | 3/2013 | Philavong et al. | |
| 2013/0124707 A1* | 5/2013 | Ananthapadmanabha | H04L 45/7457 709/223 |

(Continued)

FOREIGN PATENT DOCUMENTS

| | | |
|---|---|---|
| WO | 1999053653 A1 | 10/1999 |
| WO | 2009103225 A1 | 8/2009 |
| WO | 2010103909 A1 | 9/2010 |

OTHER PUBLICATIONS

OpenFlow Network Foundation, OpenFlow Switch Specification, Version 1.4.0 (Wire Protocol 0x05), ONF TS-012, Oct. 14, 2013, pp. 9, 15-17.*

(Continued)

*Primary Examiner* — Hanh N Nguyen
*Assistant Examiner* — Jose L Perez
(74) *Attorney, Agent, or Firm* — Jason Friday; Andrew M. Calderon; Roberts Mlotkowski Safran Cole & Calderon, P.C.

(57) ABSTRACT

A control channel for routing management messages to or from an OpenFlow controller is separated from a reserved port within a data channel for routing unknown data packets to or from the OpenFlow controller. The port may be reserved by setting a reserved port flag. A packet routing table may include a table miss entry that indicates the unknown packets should be routed via the reserved port. By utilizing the reserved port to route unknown packets, the unknown packets do not traverse into the control channel, and the separation of the OpenFlow control channel from the OpenFlow data channel is enhanced.

18 Claims, 2 Drawing Sheets

(56) References Cited

U.S. PATENT DOCUMENTS

| | | |
|---|---|---|
| 2013/0163475 A1 | 6/2013 | Beliveau et al. |
| 2013/0170495 A1 | 7/2013 | Suzuki et al. |
| 2013/0176850 A1 | 7/2013 | Mishra et al. |
| 2013/0230047 A1* | 9/2013 | Subrahmaniam ... H04L 47/2441 370/392 |
| 2013/0297790 A1* | 11/2013 | Ashihara ................. H04L 45/42 709/224 |
| 2014/0098669 A1* | 4/2014 | Garg ....................... H04L 45/38 370/235 |
| 2015/0052576 A1* | 2/2015 | Togawa ............................ 726/1 |
| 2015/0055508 A1* | 2/2015 | Ashida et al. .......... H04L 41/04 370/254 |
| 2016/0156504 A1* | 6/2016 | Wang ................. H04L 41/0695 370/217 |

OTHER PUBLICATIONS

OpenFlow Network Foundation, OpenFlow Switch Specification, Version 1.4.0 (Wire Protocol 0x05), ONF TS-012, Oct. 14, 2013, pp. 9, 15-17 (Year: 2013).*

OpenFlow Network Foundation, OpenFlow Management and Configuration Protocol, Version 1.1.1, (OF-Config 1.1.1), ONF TS-008, Mar. 23, 2013, pp. 5, 46-48 (Year: 2013).*

\* cited by examiner

Port Descriptor 300

Table Miss Entry 400
{Match: all Action: output : port (110), packet header Priority: lowest}
FIG. 4
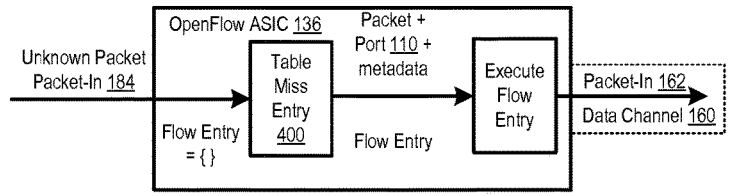
FIG. 5
Packet Out Flow Entry 500
{Match: ingress-port: port (110), other qualifies Action: output: port (108)}
FIG. 6
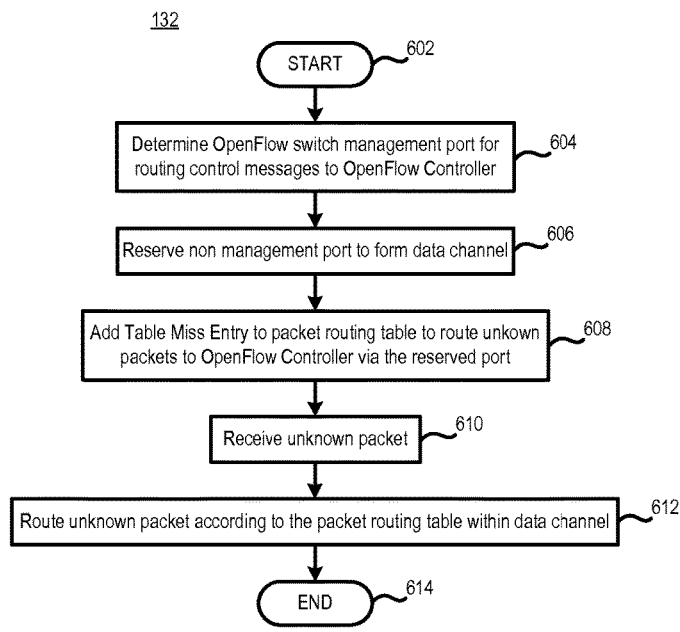
FIG. 7

OPENFLOW DATA CHANNEL AND CONTROL CHANNEL SEPARATION

FIELD

Embodiments of invention generally relate to networking, and more specifically relate to the separation of data channels from control channels in OpenFlow Networks.

DESCRIPTION OF THE RELATED ART

Currently, there is a movement for new enterprise network deployments to utilize OpenFlow, an open communications protocol. OpenFlow allows the path of network packets through the network of switches to be determined by control software running on, for example, a server, router, etc. One of the goals of OpenFlow is to separate control messages from data packets. However, known OpenFlow approaches do not adequately do so. Accordingly, there is a need for improvements in the separation of data channels from control channels in OpenFlow networks.

SUMMARY

Embodiments of invention generally relate to networking, and more specifically relate to the separation of data channels from control channels in OpenFlow Networks.

In a first embodiment of the present invention a system to separate the control channel from the data channel within an OpenFlow network includes a control channel to route management messages to or from an OpenFlow controller and a data channel to route data packets to or from the OpenFlow controller. The data channel includes a reserved port to route unknown packets to or from the OpenFlow controller. In certain implementations, the port is reserved by setting a reserved port flag. In certain implementations, the system may also include a packet routing table with a table miss entry that indicates the unknown packets should be routed via the reserved port.

In another embodiment of the present invention, a method of for separating the control channel from the data channel includes routing management messages within the control channel to or from an OpenFlow controller, and routing the unknown packet via the reserved port within the data channel to or from the OpenFlow controller.

In yet another embodiment of the present invention, a computer program product for separating the control channel from the data channel includes a computer readable storage medium having program code embodied therewith, the program code being executable by an OpenFlow ASIC to route management messages within the control channel to or from the OpenFlow controller and route the unknown packet via the reserved port within a data channel to or from the OpenFlow controller.

By utilizing the reserved port to route the unknown packet, the unknown packet does not traverse into the control channel and the separation of control channel from data channel is enhanced.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 depicts an exemplary table miss entry in accordance with various embodiments of the present invention.

FIG. 5 depicts an exemplary unknown packet flow, in accordance with various embodiments of the present invention.

FIG. 6 depicts an exemplary packet-out flow entry in accordance with various embodiments of the present invention.

FIG. 7 depicts a flow diagram of logic to form a data channel for routing unknown packets, in accordance with various embodiments of the present invention.

DETAILED DESCRIPTION

Figure 1:
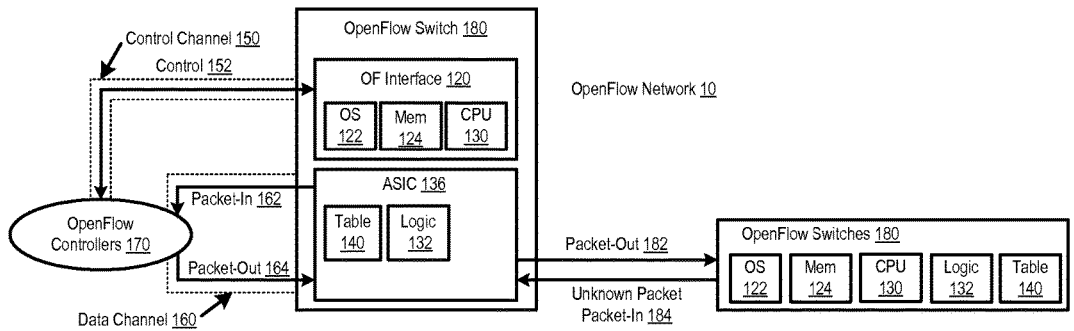
FIG. 1 depicts an exemplary OpenFlow network, in accordance with various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts an exemplary OpenFlow network 10 including one or more OpenFlow controllers 170 and one or more OpenFlow switches 180, in accordance with various embodiments of the present invention. An OpenFlow switch 180 is communicatively coupled to OpenFlow Controller 170 via a control channel 150 and a data channel 160. Control channel 150 is utilized to transfer control messages from OpenFlow Controller 170 to OpenFlow switch 180 via control connection 152. Data channel 160 is utilized to transfer data packets between OpenFlow switch 180 and OpenFlow Controller 170 via Packet-In connection 162/ Packet-Out connection 164, respectively. OpenFlow switch 180 is also communicatively coupled to other OpenFlow switches 180 via Packet-In connection 184 and Packet-Out connection 182.

In certain embodiments OpenFlow switch 180 includes an OpenFlow Interface 120 for communicating with one or more OpenFlow Controllers 170 via control channel 150. The OpenFlow Interface 120 may include an operating system 122, memory 124, central processing unit (CPU) 130, etc. In certain embodiments OpenFlow switch 180 also includes an OpenFlow application specific integrated circuit (ASIC) 136 for communicating with one or more OpenFlow Controllers 170 via data channel 169. OpenFlow ASIC 136 may include logic module(s) 132, packet routing table 140, etc.

OpenFlow switch 180 includes a central processing unit (CPU) 130 and memory 124. CPU 130 may be any known device that carries out the instructions of a program (e.g. operating system 122, logic 132, etc.) by performing the basic arithmetical, logical, and input/output operations. OpenFlow switch 180 may have more than one CPU 130 (e.g. multiprocessor, multi-core processors, etc.). CPU 130 includes an arithmetic logic unit (ALU), which performs arithmetic and logical operations, and the control unit, which extracts instructions (e.g. software, code, program, logic 132, etc.) from memory 124 and decodes and executes the instructions, calling on the ALU when required. Memory 124 may be any known storage device that allows for data to be stored and accessed by CPU 130. Memory 124 may be RAM (e.g. SRAM, ROM, OTP, NOR flash, etc.), SRAM, DRAM, or other such equivalents used in association with CPU 130.

OpenFlow ASIC 136 may be a microprocessor, memory blocks including ROM, RAM, EEPROM, flash memory, a system-on-chip, FPGA, programmable logic blocks, etc. In certain embodiments, OpenFlow ASIC 136 is distinct from CPU 130. In alternative embodiments, OpenFlow ASIC 136 functionality described here may be carried out by CPU 130.

Typically, OpenFlow allows the path of network packets through the network of switches to be determined by OpenFlow controllers running on various OpenFlow devices (e.g. servers, routers, etc.). One of the goals of OpenFlow is to separate data from control signals. However, known OpenFlow approaches are not highly effective because unknown packets within the OpenFlow network, typically sent to OpenFlow controllers (as packet-in) and/or packets sent from OpenFlow controllers (as packet-out) share a similar channel with OpenFlow control messages. These packets sent to/from OpenFlow controllers need to be subsequently processed by an agent module running on an egress OpenFlow switch CPU. These packets can increase the load of the CPU to the point of consuming all of the CPU resource causing control and data packet drops.

Therefore, according to various embodiments of the present invention, OpenFlow Network 10 separates OpenFlow data from control signals by utilizing control channel 150 and data channel 160. In certain embodiments of the present invention, unknown packets are placed in a dedicated channel to/from OpenFlow controllers 170 by ASIC 136 thereby reducing overhead on egress OpenFlow switch CPU while providing lossless behavior with less transmission delay.

Figure 2:
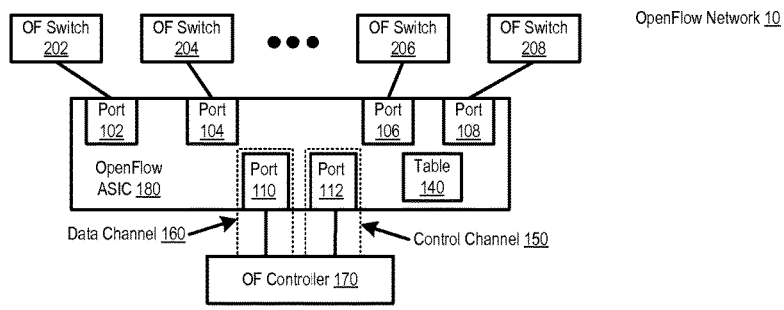
FIG. 2 also depicts an exemplary OpenFlow network, in accordance with various embodiments of the present invention.

FIG. 2 depict an exemplary OpenFlow network 10, according to various embodiments of the present invention. OpenFlow switch 180 may include various ports. For example, OpenFlow switch 180 may include a port 102 connected to OpenFlow switch 202, a port 104 connected to OpenFlow switch 204, a port 106 connected to OpenFlow switch 206, and a port 108 connected to OpenFlow switch 208. OpenFlow switch 180 may also include a data port 110 and management port 112 both connected to OpenFlow Controller 170.

Figure 3A:
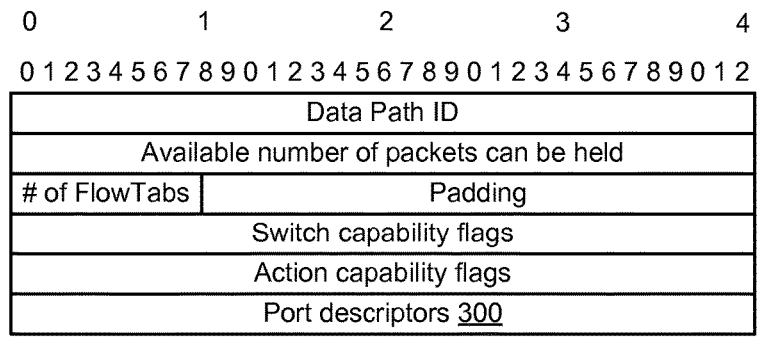
FIG. 3A depicts an exemplary Feature Reply Message, in accordance with various embodiments of the present invention.
Figure 3B:
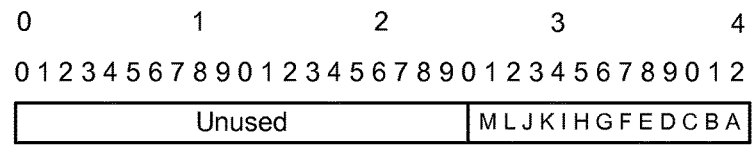
FIG. 3B depicts an exemplary port descriptor field, in accordance with embodiments of the present invention.

Data channel 160 may be created by assigning port pairs [102, 110], [104, 110], [106, 110], and [108, 110] with a unique unicast domain, in accordance with various embodiments of the present invention. In certain embodiments, the unique unicast domain may be created by reserving data port 110. Data port 110 may be reserved by triggering a port feature flag, by for example, setting a reserve bit 'M' within the Port Descriptor field 300. When reserve bit 'M' is set, port 110 is a reserved or dedicated port in accordance with the various embodiments of the present invention. When reserve bit 'M' is not set, port 110 is not a reserved or dedicated port. The reservation of port 110 may be communicated to OpenFlow controller 170 using, for example, a feature reply message, where the port feature flag may be set. An exemplary Feature Reply Message is depicted in FIG. 3A and an exemplary port descriptor field 300 is shown in FIG. 3B.

FIG. 4 depicts an exemplary table miss entry 400, in accordance with various embodiments of the present invention. The table miss entry 400 may be added to table 140 to forward unknown packets to/from OpenFlow Controller 170 via the reserved data port. The table miss entry 400 includes an associated action that directs switch 180 to, for example, forward unknown packets to/from OpenFlow Controller 170 via the reserved data port. As such, all unknown packets will be forwarded via reserved data port automatically. An exemplary table miss entry 400 is shown in FIG. 3. The exemplary table miss entry 400 indicates that all table misses should be associated with an output action at a lowest priority level. The exemplary table miss entry 400 also includes requisite packet header information (e.g. information on incoming port, switch ID, reason, etc.) and may be added by OpenFlow switch 180 in association with a previous negotiation with the OpenFlow controller 170 or it may be generally added by OpenFlow ASIC 136.

FIG. 5 depicts an exemplary unknown packet flow, according to various embodiments of the present invention. An OpenFlow switch, e.g. OpenFlow switch 202, sends an unknown packet to OpenFlow ASIC 136 via Packet-In 184. In accordance with the various embodiments of the present invention, an unknown packet is a data packet that, but for the table miss entry, is not known or identifiable within packet routing table 140 (e.g. packets with unknown source or destination MAC addresses, etc.). When the packet is received, OpenFlow ASIC 136 queries table 140 to determine and implement a packet route. However, because the packet is unknown a predetermined route is not known. Under known OpenFlow approaches, these unknown packets would have been forwarded by the ingress switch to the controller which would in turn forward these packets to the egress switch so that the packets are not dropped, straining switch CPU and resulting in the unknown packet traversing the boundaries of typical data-plane and control-plane. However, in accordance with various embodiments of the present invention, the table miss entry 400 provides a default route for such otherwise unknown packets. Table miss entry 400 indicates the reserved port (e.g. data port 110, etc.) and may indicate associated metadata to generate a packet flow entry whereby execution of which routes the unknown packet to, for example, OpenFlow Controller 170 via packet-In 162 within data channel 160. In this manner, the unknown packet will not traverse the boundary into control channel 150 and the separation of control channel 150 from data channel 160 within OpenFlow Network 10 is enhanced.

In certain embodiments, it may be desired for OpenFlow Controller 170 to communicate to the ingress OpenFlow switch to forward packet-out. In such embodiments, a packet-out flow entry 500 is added to table 140. An exemplary packet-out flow entry 500 is shown in FIG. 6. The exemplary packet-out flow entry 500 indicates that the unknown packet received on the reserved port should be forwarded to an egress OpenFlow switch via, for example, port 108.

In certain embodiments, an OpenFlow switch may connect with OpenFlow Controller 170 via management port 112 or data port 110. If the switch uses management port 112 to connect with OpenFlow Controller 170, data port 110 should be reserved for transmitting the data packets to/from controller.

FIG. 7 depicts an flow diagram of logic 132 to form data channel 150 for routing unknown packets, in accordance with various embodiments of the present invention. Logic 132 may take the form of machine-readable instructions (program, module, etc.) that directs CPU 130 in conjunction with memory 124 to perform specific operations herein described. Logic 132 begins at block 602 and continues with OpenFlow ASIC 136 determining the port deemed the management port 112 that is used for communicating control messages from OpenFlow ASIC 136 and OpenFlow controller 170 (block 604). For example, OpenFlow ASIC 136 communicates a feature reply message to OpenFlow controller 170 to effectively determine the management port 112. In other embodiments, OpenFlow ASIC 136 may identify the management port 112 by setting a port feature flag.

Logic 132 continues with OpenFlow ASIC 136 reserving a port that is not the management port 112 as data port 110 (block 606). Data port 110 may be reserved by triggering a port feature flag to indicate that it is a reserved port. For example, OpenFlow ASIC 136 may set a reserve bit 'M' within Port Descriptor field 300 of a feature reply message. When reserve bit 'M' is set, port 110 is a reserved or dedicated data port. The reservation of port 110 may be communicated to OpenFlow controller 170 using, for example, a feature reply message, where the port feature flag may be set. By reserving port 110, data channel 160 is created for routing unknown packets.

Logic 132 continues with adding table miss entry 400 to packet routing table 140 (block 608) for forwarding unknown packets to/from OpenFlow Controller 170 via the reserved data port. With the addition of table miss entry 400, unknown packets will be forwarded via reserved data port automatically thereby forming a default unknown packet route. Table miss entry 400 may be added to the packet routing table 140 by an OpenFlow switch 180 in association with a previous negotiation with the OpenFlow controller 170 or it may be generally added by OpenFlow ASIC 136.

Logic 132 continues with OpenFlow ASIC 136 receiving an unknown packet (block 610). For example, OpenFlow switch 202, sends an unknown packet to OpenFlow ASIC 136 via Packet-In 184. When the packet is received, OpenFlow ASIC 136 may query table 140 to determine and implement a packet route. Alternatively, OpenFlow ASIC 136 may automatically route the unknown packet via the default route (e.g. the reserved port).

Logic 132 continues with OpenFlow ASIC 136 routing the unknown packet (block 612). For example, OpenFlow ASIC 136 may generate a packet flow entry whereby execution of which routes the unknown packet to, for example, OpenFlow Controller 170 via packet-In 162 within data channel 160. With the execution of Logic 132, the unknown packet will not traverse the boundary into control channel 150 and the separation of control channel 150 from data channel 160 within OpenFlow Network 10 is enhanced. Logic 132 ends at block 614.

The drawings are not necessarily to scale. The drawings are merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A system to separate a control channel from a data channel within an OpenFlow network, the system comprising:
    a control channel to route management messages to or from an OpenFlow controller;
    a data channel to route data packets to or from the OpenFlow controller, the data channel comprising:
        a reserved port in an OpenFlow switch to route unknown packets to or from the OpenFlow controller on a dedicated channel within the data channel based upon a table miss entry in a packet routing table in an OpenFlow ASIC in the OpenFlow switch that indicates the unknown packets are routed via the reserved port,
    wherein the table miss entry indicates that all table misses are associated with an output action at a lowest priority level,
    wherein the table miss entry indicates associated metadata which is used by logic in the OpenFlow ASIC to generate a packet flow entry for routing the unknown packets to the OpenFlow controller via the dedicated channel within the data channel, and
    wherein the logic in the OpenFlow ASIC is configured to prevent the unknown packets from traversing into the control channel upon routing the unknown packets via the reserved port within the data channel to or from the OpenFlow controller.

2. The system of claim 1 wherein the reserved port is reserved by setting a reserved port flag.

3. The system of claim 1 wherein the unknown packet is a packet that, but for the table miss entry, is not identifiable within the packet routing table.

4. The system of claim 1 wherein the unknown packet is a packet sent from an unknown OpenFlow switch.

5. The system of claim 2 wherein the reserved port flag is set by setting a reserve bit within a port descriptor field of a feature reply message.

6. A method for separating a control channel from a data channel within an OpenFlow network, the method comprising:
    routing management messages within a control channel to or from an OpenFlow controller via a management port in an OpenFlow switch, and
    routing an unknown packet via a reserved port in the OpenFlow switch, separate from the management port, within a data channel to or from the OpenFlow controller on a dedicated channel within the data channel based upon a table miss entry in a packet routing table that indicates the unknown packets are routed via the reserved port,
    wherein the table miss entry indicates associated metadata to generate a packet flow entry for routing the unknown packets to the OpenFlow controller, and
    wherein the OpenFlow switch is configured to prevent the unknown packets from traversing into the control channel upon routing the unknown packets via the reserved port within the data channel to or from the OpenFlow controller.

7. The method of claim 6, the method further comprising:
    reserving the reserved port within the data channel by setting a reserved port flag that is associated with the port.

8. The method of claim 6 wherein the unknown packet is a packet that, but for the table miss entry, is not identifiable within the packet routing table.

9. The method of claim 6 wherein the unknown packet is a packet sent from an unknown OpenFlow switch.

10. The method of claim 7 wherein setting the reserved port flag further comprises:
    setting a reserve bit within a port descriptor field of a feature reply message.

11. A computer program product for separating a control channel from a data channel within an OpenFlow network, the computer program product comprising a non-transitory computer readable storage medium having program code embodied therewith, the program code being executable by and OpenFlow ASIC to cause the OpenFlow ASIC to:

route management messages within a control channel to or from an OpenFlow controller, and route an unknown packet via a reserved port within a data channel to or from the OpenFlow controller on a dedicated channel within the data channel based upon a table miss entry in a packet routing table that indicates the unknown packets are routed via the reserved port, wherein the table miss entry indicates associated metadata to generate a packet flow entry for routing the unknown packets to the open flow controller via the dedicated channel within the data channel, and wherein the program code is further executable by the OpenFlow ASIC to form a management port in the OpenFlow switch for communication with the OpenFlow controller via the control channel, to form the reserved port as a data port, separate from the management port, for communication with the OpenFlow controller via the data channel, and to prevent the unknown packets from traversing into the control channel via the management port upon routing the unknown packets via the reserved port within the data channel to or from the OpenFlow controller.

12. The computer program product of claim 11 wherein the program code is further executable by the OpenFlow ASIC to:

reserve a port within the data channel by setting a reserved port flag that is associated with the port.

13. The computer program product of claim 11 wherein the unknown packet is a packet sent from an unknown OpenFlow switch.

14. The computer program product of claim 12 wherein the setting a reserved port flag is further executable by the OpenFlow ASIC to:

set a reserve bit within a port descriptor field of a feature reply message.

15. The system of claim 1, wherein the logic in the OpenFlow ASIC forms a management port in the OpenFlow switch for communication with the OpenFlow controller via the control channel.

16. The system of claim 15, wherein the logic in the OpenFlow ASIC forms the reserved port as a data port, separate from the management port, for communication with the OpenFlow controller via the data channel.

17. The system of claim 16, wherein the logic in the OpenFlow ASIC identifies the management port by setting a management port flag.

18. The system of claim 17, wherein the logic in the OpenFlow ASIC reserves the reserved port by setting a reserved port flag, and wherein the setting of the management port flag and the reserved port flag are communicated to the OpenFlow controller with feature reply messages.

* * * * *